United States Patent [19]

Lund

[11] Patent Number: 4,512,145
[45] Date of Patent: Apr. 23, 1985

[54] ASPARAGUS HARVESTER
[75] Inventor: William J. Lund, Stockton, Calif.
[73] Assignee: Spear Harvesters, Stockton, Calif.
[21] Appl. No.: 440,138
[22] Filed: Nov. 8, 1982
[51] Int. Cl.³ .............................................. A01D 45/00
[52] U.S. Cl. .................... 56/327 A; 56/10.2; 56/14.5
[58] Field of Search ............... 56/327 A, 327 R, 14.1, 56/14.2, 14.3, 14.5, 16.4, 10.2, DIG. 15; 198/772, 624

[56] References Cited
U.S. PATENT DOCUMENTS 2,581,119  1/1952  Matteolli ............... 56/327 A
3,636,687  1/1972  McKissick et al. ....... 56/327 A
4,064,682 12/1977  Haws .................... 56/327 A
4,189,906  2/1980  Cooper ................. 56/327 R

FOREIGN PATENT DOCUMENTS 53994  6/1982  European Pat. Off. ......... 56/327 A

OTHER PUBLICATIONS

R. A. Kepner, "Mechanical Harvester for Green Asparagus", 11/20/1958.

Primary Examiner—Gene Mancene
Assistant Examiner—John G. Weiss
Attorney, Agent, or Firm—Lothrop & West

[57] ABSTRACT

An asparagus harvester has a frame movable along and above a bed of growing asparagus. Spears above a selected height are detected optically and are severed below ground and held and conveyed to a storage area.

7 Claims, 10 Drawing Figures

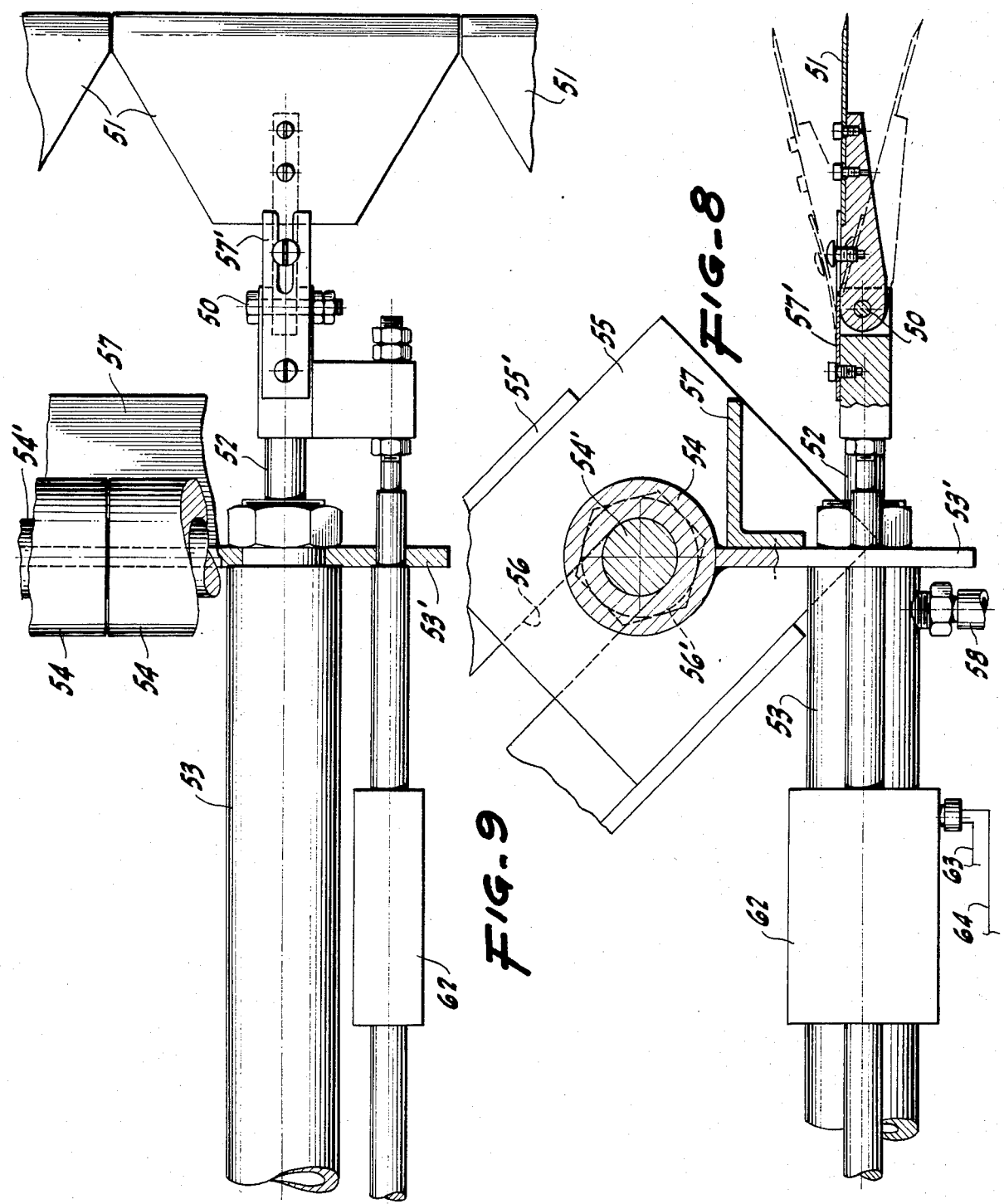

ASPARAGUS HARVESTER

BRIEF SUMMARY OF THE INVENTION

A vehicle frame is movable along a path in an asparagus field to overlie asparagus spears growing in the ground and projecting to various heights at random locations in the path. An optical sender and an optical receiver on the leading portion of the frame afford a transverse light beam at a selected height. The beam is interrupted by an asparagus spear of more than a predetermined height and actuates a reciprocable severing blade mounted to swing on the frame to move forwardly and downwardly and below the ground to sever the asparagus spear. A pair of soft rollers on the frame engages opposite sides of the spear and exerts an upward and forward force on the spear to lift it and then deposit it on a conveyor that carries the spear to a storage area on the frame. There are various special arrangements cooperating with the light beam structure, with the severing blade, and with the lifting rollers to accommodate the special and varying growing habits of the asparagus spears.

BRIEF DESCRIPTION OF THE SEVERAL VIEWS OF THE DRAWINGS

FIG. 8 is a side elevation, with portions in section and with portions broken away, of a spear severing blade, its actuator and its mounting.

FIG. 9 is a plan of the structure shown in FIG. 8.

FIG. 10 is a side elevation to an enlarged scale of a ground height sensor.

DETAILED DESCRIPTION

Figure 1:
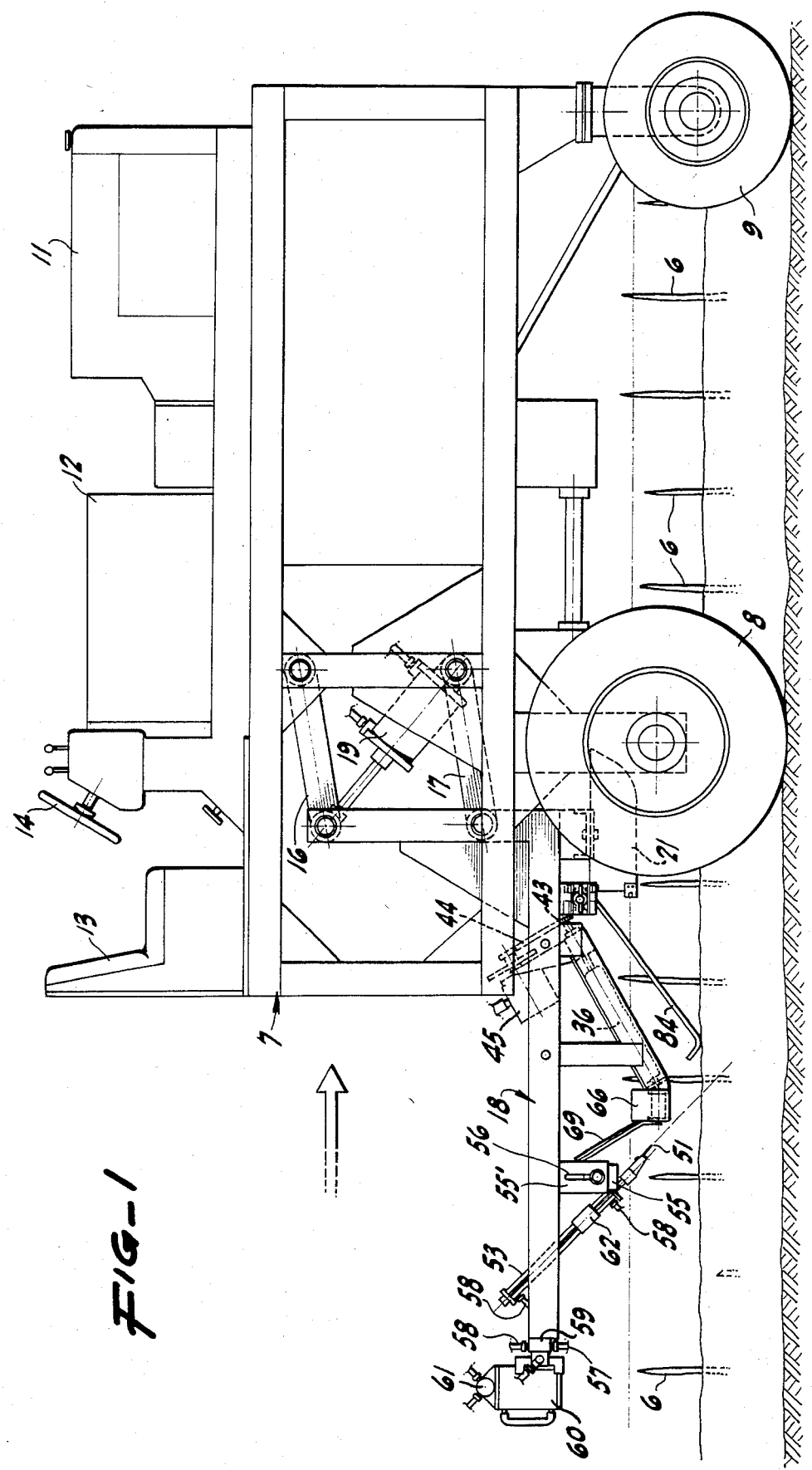
FIG. 1 is a side elevation of a mobile frame carrying the various harvesting structures.
Figure 2:
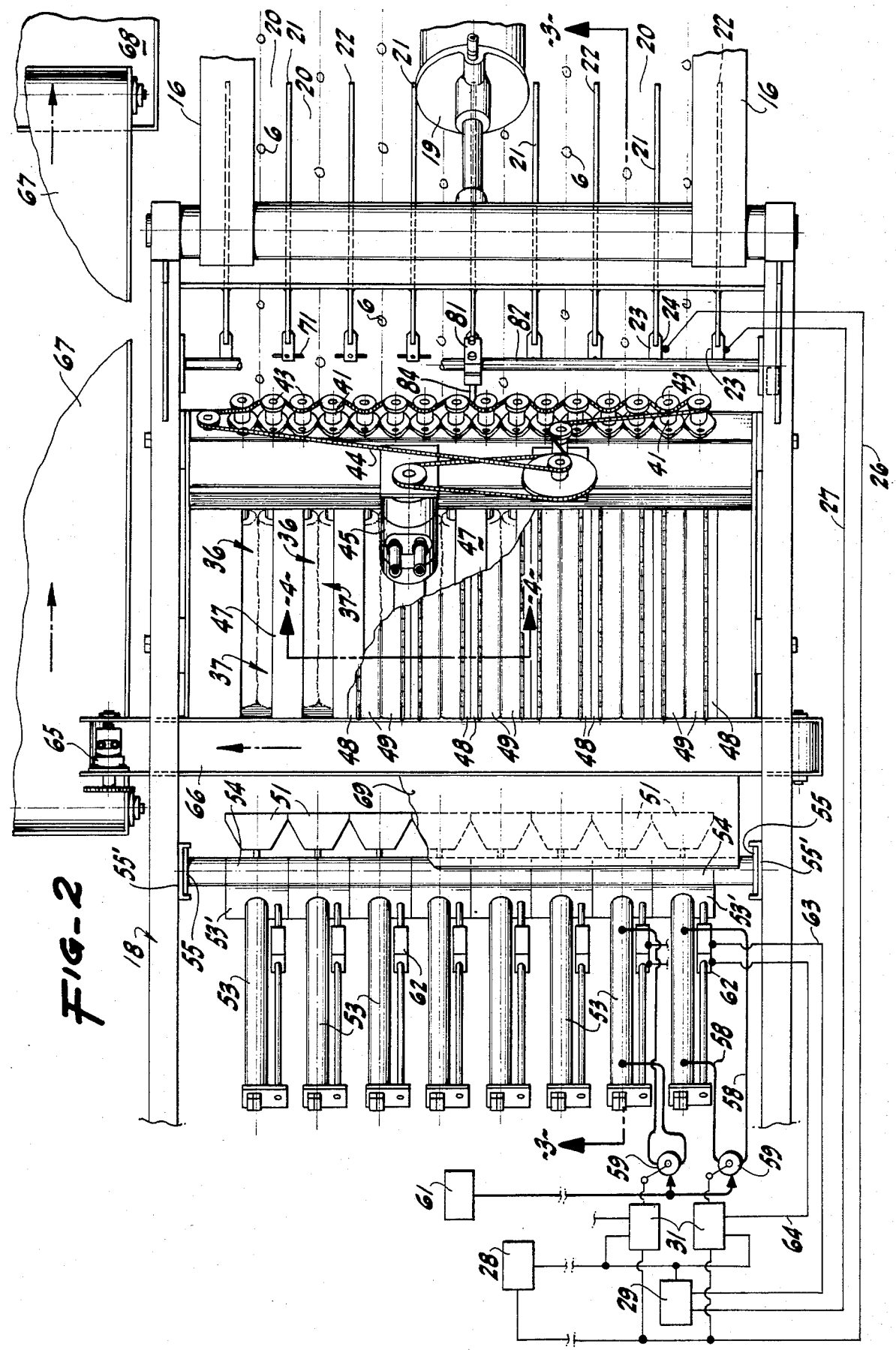
FIG. 2 is a plan partially diagrammatic and with portions broken away showing the harvester portion of the mobile frame.

Asparagus is customarily cultivated in a fairly friable or loamy soil and is planted to emerge at random and as spears 6 disposed generally in a longitudinal row or path of a predetermined width. The spears 6 emerge from below the ground and extend to varying heights. It is of interest to harvest such spears of more than a predetermined height while leaving the remaining spears to continue growing in the ground for later harvesting.

In the present instance, there is provided for this purpose a main frame 7 of a vehicle having ground-engaging wheels 8 and 9 of the customary sort spaced apart transversely so that they straddle or span the growing row. The frame 7 supports a propelling unit 11, fuel tanks 12, and the other customary attributes of a self-propelled device. The main frame is controlled by an operator sitting in a seat 13 with a steering wheel 14 and other controls available to him.

The mid-portion of the main frame 7 is connected by pairs of parallelogram links 16 and 17 to a sub-frame 18 extending rearwardly of the vehicle frame 7 to advance over the asparagus bed. A suitable power cylinder 19 is under the operator's control or under automatic control and is effective to lift and lower the sub-frame 18 to any desired elevation and in this way affords a selection of the height of the asparagus spears to be harvested. In effect, the sub-frame trails the main frame and occupies a selected elevation, not only with respect to the main frame, but particularly with respect to the subjacent ground level.

As the vehicle advances along the row, some of the asparagus spears are tall enough to project upwardly and to enter generally into alleys 20 or spaces between individual pairs of a transverse series of vertical plates 21 and 22, for example. The plates are planar and are disposed longitudinally or parallel to the path of advance and are disposed at an appropriate distance above the ground. The individual ones of adjacent pairs of plates carry means for affording a light beam in a transverse, horizontal direction. For example, there is a light source 23 on one plate of each individual compartment or alley 20 and an aligned light receiver 24 mounted on the adjacent plate. The light beams are separately connected by appropriate circuitry 26 and 27, not only to a source of power 28 on the main frame, but also through a representative detector 29 and to an appropriate one of a corresponding plurality of individual actuators 31.

As the machine advances, the effect of relatively short asparagus spears is not consequential since the spears are not tall enough to interrupt any light beam, but the tall spears do interrupt the appropriate one or ones of light beams between the individual sources 23 and their receivers 24 and cause the corresponding detectors to be alerted and the corresponding actuators to be energized.

The breaking of a light beam is not necessarily immediate in effect since the detector and actuator circuit may include a time delay structure. Particularly, this may be a delay dependent upon the amount of rotation of one of the vehicle wheels (corresponding to an amount of vehicular advance) so that from the time an asparagus spear interrupts the light beam until the actuator becomes effective upon that particular spear may be a time lapse of a predetermined or selected amount related to the amount or speed of advance of the vehicle.

Arranged on the sub-frame immediately to the rear of the leading plates 21 and 22 are holding rollers 36 and 37. These are comparable in number to the plates and likewise are arranged in pairs. The spaces between certain roller pairs are disposed in longitudinal alignment with or centrally of the spaces or alleys 20 between the plates 21 and 22. The rollers are mounted for rotation about parallel axes lying in longitudinal planes and parallel to each other and arranged at an inclination with the aft portion of the rollers close to the ground and the forward portion of the rollers at a greater distance from the ground.

The rollers are provided preferably with relatively rigid cores 38 and with surrounding coverings 39 of yieldable, relatively soft material such as foam rubber or the like. The rollers are each mounted in journals 41 and 42 and carry drive sprockets 43 all in engagement with a common chain 44 appropriately connected to a driver 45 ultimately propelled by the power source 11. All of the rollers are simultaneously rotated at substantially the same speed, and the adjacent rollers 36 and 37 of each pair move with their closest portions having an upward component.

Since the alternate gaps between the rollers then have a downward component, those gaps are blocked by covering plates 47 appropriately supported across the gap between the downwardly moving portions of the rollers. Hinges 48 are mounted on the plates 47 and are provided with light-weight leaves 49 adapted to swing upwardly and to fall back by gravity and against the plates 47 as stops. Upwardly moving asparagus spears being ejected by the rollers 39 can readily displace the hinge leaves to permit the spears to pass. The leaves 49 then return by gravity to a position stopped by the plates 47 and in locations effective to block material potentially moving downwardly.

As the vehicle advances, there are brought into action individual ones of a corresponding number of severing blades 51. These are arranged in a transverse array with one blade for each of the spaces or alleys 20 between the initial plate pairs 21 and 22. The blades may overlap each other. Each blade is connected flexibly to a plunger 52 in an actuator cylinder 53. The blade connection preferably includes a transverse pivot 50 with a spring 57' effective to urge the blade, after displacement, back into its central position in general alignment with the actuator plunger. This yieldable connection permits momentary deviation of the blade downwardly or upwardly should it strike a rock, for example.

The actuator cylinders 53 are supported parallel to each other and at a standard but momentarily variable inclination with respect to the ground. Each cylinder 53 has a cross plate 53' joined to an individual tube section 54. The tube sections are rotatably supported on a common cross rod 54' at its opposite ends passing through a circular opening (not shown) in a slide plate 55 vertically movable in a frame channel 55'. A vertical slot 56 in the channel 55' allows adjustment of the slide plate position. A nut 56' (FIG. 8) when loose permits the adjustment and when tight holds the slide plate in the set position.

This mounting arrangement of the cylinders 53 allows the cylinders individually to swing or pivot freely in a vertical plane. A stop in an extreme position is afforded by a cross angle iron 57 at its opposite ends firmly secured to the slide plates 55. With this mounting, some rotation or yielding of each individual cylinder and its accompanying mechanism is permitted especially when the respective severing blade 51 is stationary in the ground and the machine frame 7 and subframe 18 advance. When the blade 51 is subsequently withdrawn from the ground and there is no longer such constraint upon the cylinder mechanism, the cylinder 53 and its appurtenances return by gravity to a normal rest position against the angle iron 55' as a stop. In this way there is afforded considerable leeway between the speed of advance of the vehicle and the speed of reciprocation of the severing blades.

Each individual actuator 53 is preferably pneumatic and has flexible conduits 58 coupled to the opposite ends thereof and joined through a respective valve 59 either to a source 61 of air under pressure or to the atmosphere. If desired, the pressure air is provided with a lubricating oil additive from a tank 60. The valve is controlled by the assigned actuator 31 under the influence of the particular detector 29 as regulated by the light beam between the plates 21 and 22 of a single alley 20. Thus, when an impulse is effective upon one actuator 31, the proper valve 59 is moved so that air under pressure is supplied through the proper conduit 58 to cause the plunger 52 in the cylinder 31 to eject and to cause the connected blade 51 to move downwardly and forwardly along the inclined axis of the cylinder.

The blade enters into the ground in its respective alley 20 and travels a short distance below the surface thereof and severs the asparagus spear in its path that did the initial triggering. Since the blade is somewhat yieldable, it can easily accommodate the local environment and even though somewhat deflected can sever the spear. When the blade completes its cutting excursion, it immediately is restored to its normal, upper rest position by reversal of the valve 59.

The motion of the actuator plunger 52 is detected by a sensor 62 having control lines 63 and 64 which extend not only to the respective detector 29, but also to the related actuator 31. The air supply is reversed after appropriate plunger projection, and the blade is withdrawn to its rest position, with most of the plunger retracted within the actuator 53 and ready for a subsequent stroke.

Disposed adjacent the trailing portions of the rollers 36 and above the projected actuator blades 51 there is a cross conveyor 66 in the form of a belt in the path of the severed asparagus spears discharged from the rollers. The belt 66 is driven by a motor 65 and carries the spears to a longitudinal conveyor 67 leading to a storage space 68 on the main frame 7. There is a backstop plate 69 along one boundary of the belt conveyor 66.

In the general operation of this structure, as the frame advances along the row in the field, asparagus spears become disposed in appropriate alleys 20 between the appropriate ones of the plate pairs 21 and 22. The tall spears (of a pre-selected height) interrupt the light beams so that respective ones of the actuators 53 are energized. The effect is to drive the corresponding blades 51 downwardly and forwardly into the ground. This severs the actuating asparagus spears. In the meantime, each tall spear has been engaged on its opposite sides by the relatively soft upwardly trending rollers 36. An upward force is thus exerted on the gripped spears, but not to an extent to uproot the spears or break the spears, but only to hold and support any uncut spears and the cut spears while the blades do their work. The severed spears, then lifted upwardly and carried somewhat rearwardly by the rotating rollers, are cast or discharged upon the conveyor 66. Finally, they are carried onto the other conveyor 67 and to a storage spot on the main frame, thus completing the harvesting operation.

Figure 5:
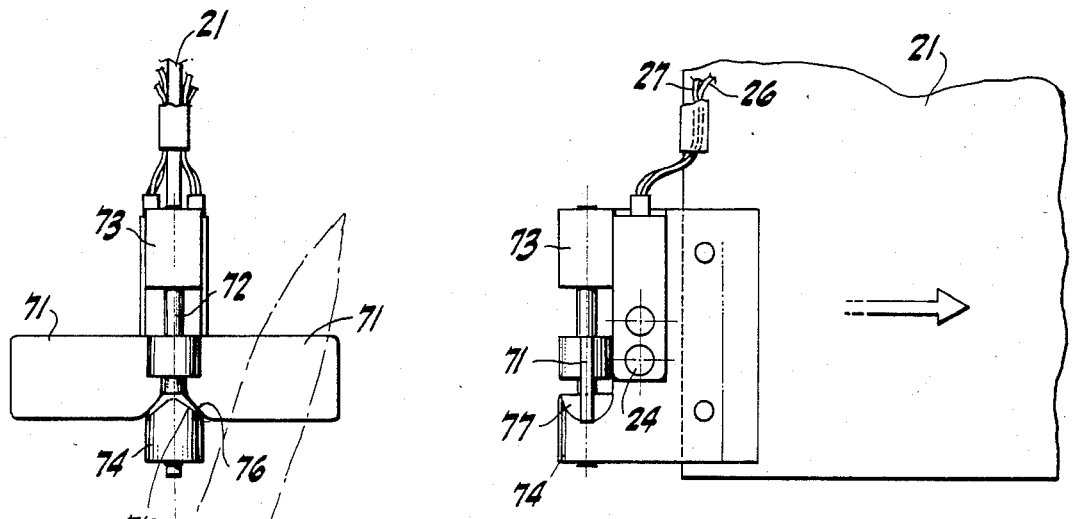
FIG. 5 is a detail showing in side elevation a typical asparagus spear position responder.
Figures 6, 7:
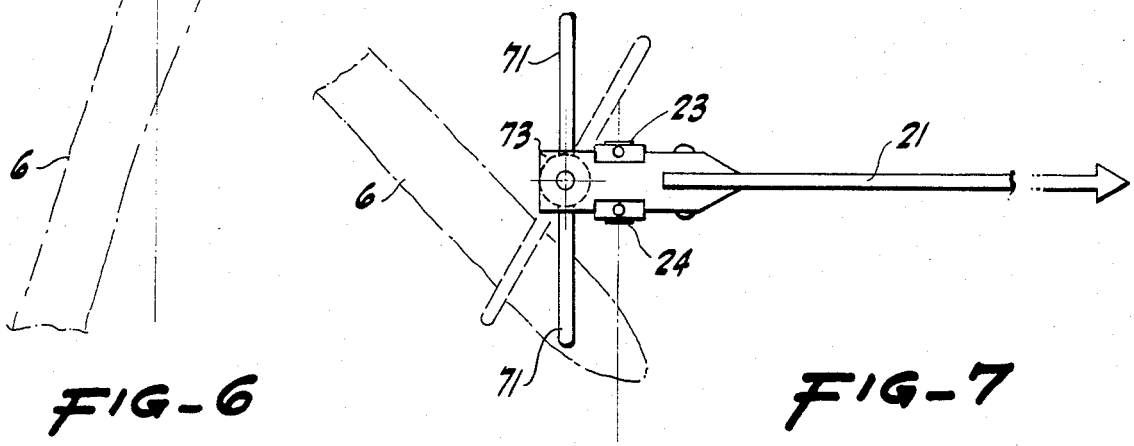
FIG. 6 is a detail showing in front elevation the structure of FIG. 5.
FIG. 7 is a plan of the structure of FIG. 5.

There are sometimes, however, some difficulties. Some asparagus stalks, as shown in FIG. 6, do not grow vertically and may have their base portions in one of the alleys 20 between the plates 21 and 22, whereas the upper portion may bend over and extend into an alley 20 between an adjacent pair of the plates. To take care of this situation there is provided near the edge of the plates (except the end plates), as especially shown in FIGS. 5, 6 and 7, a responsive trigger bar 71 centrally mounted to rotate about a vertical axis and on a rod 72 carried in bosses 73 and 74 adjacent the edge of a plate; say, the upright plate 21, for example. The bar 71 has a cam notch 76 adapted to interengage with similar cammed surfaces 77 on the boss 74. When one wing of the bar 71 is horizontally deflected by an asparagus spear that interrupts the adjacent light beam, the bar not only rotates but also rises along the rod 72.

The effect of this bar rotation by a spear encounter in one of the alleys 20 between the forward plates is to deflect the bar to interrupt the light beam in the adjacent space 20 or alley between the next pair of plates. Thus, when an asparagus spear extends from one alley into the next it is effective to cause breaks in the light beams in both alleys and so ensures that two of the blades come down to sever the stalk, so as to ensure severance no matter in which of the two alleys the stalk base happens to be. The bar 77, when free, returns by gravity and by the camming interengagement to its central, lower position.

Figure 3:
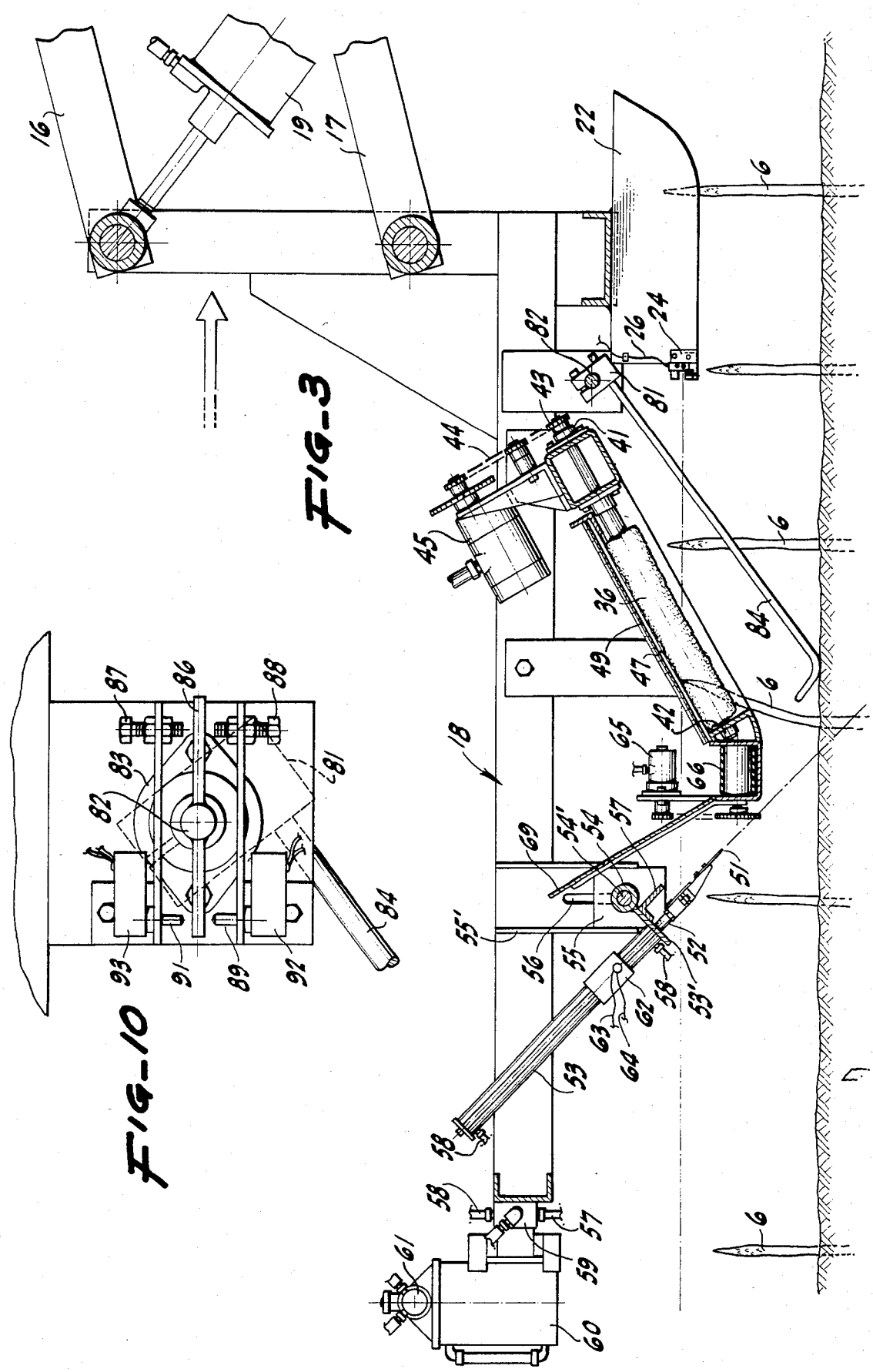
FIG. 3 is a cross-section through some of the roller lifting mechanism, the plane of section being indicated by the line 3—3 of FIG. 2.
Figure 4:
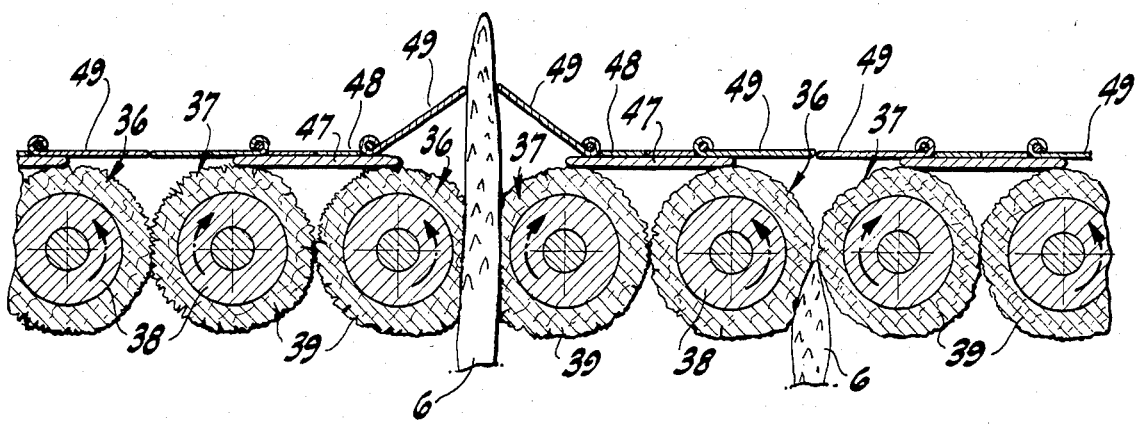
FIG. 4 is a cross-section, along the line 4—4 of FIG. 2, showing some of the roller mechanism.

The height of the sub-frame 18 with respect to the ground may be set, as described, or may be automatically adjusted. As especially shown in FIGS. 1, 3 and 10, the sub-frame carries a pinch-secured mounting block 81 for rotation about the axis of a transverse shaft 82 with respect to a plate 83. A feeler finger 84 extends downwardly and rearwardly from the block 81 and is curved to ride along the surface of the ground. On the shaft 82 is an operator bar 86 at one end movable between adjusting screws 87 and 88 and at the other end movable against either one or the other of contacts 89 and 91 governing switches 92 and 93. The switches control the hydraulic flow into and out of the cylinder 19.

As the finger 84 moves along the ground and tends to rise or fall, the switches 92 and 93 are actuated and correspondingly the cylinder 19 responds. Thus, by setting the mounting block 81 on the shaft to represent a desired elevation with respect to the sub-frame 18, and by setting the limits for the bar 86, that elevation is automatically maintained within chosen limits by appropriate compensation.

In this way there has been provided an asparagus harvester that is effective to be driven easily in the field along a row of growing asparagus spears. The harvester can be set to harvest only those spears of more than a predetermined height and to leave the remaining spears undisturbed. The harvester is effective to sever the spears at an appropriate position beneath the surface of the soil and to extract or withdraw such severed spears from their growing location and deposit them gently upon a conveyor for carriage to eventual storage. There are sufficient adjustments and controls available so that the device can be set to accomplish virtually any harvesting operation desired.

I claim:

1. An asparagus harvester for use with asparagus spears growing in the ground and projecting upwardly therefrom in random array in a path of predetermined width comprising:
  a. a main frame;
  b. means for advancing said main frame on the ground along said path;
  c. a sub-frame;
  d. means for supporting said sub-frame on said main frame at selected heights above said ground;
  e. a plurality of vertical divider plates disposed on said sub-frame in the leading portion thereof and in an array transversely of said sub-frame, each of said divider plates being substantially planar and defining a plurality of spaces therebetween;
  f. means on said sub-frame trailing said divider plates for engaging and exerting a lifting force on the asparagus spears;
  g. means on said sub-frame and movable with respect thereto for severing the asparagus spears below the ground and to retract therefrom;
  h. height responsive means, each effective between respective pairs of said plates to actuate said severing means in response to the height of asparagus spears within a respective one of said spaces;
  i. an opaque bar mounted to pivot about a vertical axis on one of said plates and adapted to be pivoted by contact with an asparagus spear in one of said spaces to rotate about said axis and to actuate said height responsive means in adjacent ones of said spaces; and,
  j. a conveyor on said sub-frame adjacent said engaging means and said severing means for receiving and conveying away asparagus spears severed by said severing means.

2. A device as in claim 1 in which said height responsive means includes a light beam adapted to be interrupted by said opaque bar in a rotated condition, thereby actuating said height responsive means and said severing means.

3. A selective height harvester for use with asparagus spears growing in the ground and projecting upwardly therefrom in random array in a path of predetermined width, comprising:
  a. a main frame;
  b. means for advancing said main frame on the ground along the path;
  c. a sub-frame;
  d. means for supporting said sub-frame on said main frame at selected heights above said ground;
  e. a plurality of substantially planar and parallel vertical divider plates disposed on said sub-frame in the leading portion thereof and arranged transversely thereto, and in which adjacent said divider plates define spaces into which incoming asparagus spears exceeding a predetermined selective height initially enter;
  f. reciprocating severing means on said sub-frame and movable longitudinally with respect to the path of advance, said severing means being adapted first to extend forwardly and downwardly toward the asparagus spears to sever the spears beneath the ground, and then to retract rearwardly and upwardly into a rest position;
  g. height responsive means on said sub-frame, responsive to asparagus spears exceeding the predetermined selective height and effective to actuate said severing means to sever only the height selected asparagus spears; and,
  h. means on said sub-frame trailing said height responsive means for engaging and exerting a lifting force on the asparagus spears carrying upwardly those spears severed by said severing means.

4. A device as in claim 3 in which each of said spaces includes respective said height responsive means and respective said severing means, for responding to and severing height selected spears which have passed through a respective one of said spaces.

5. A device as in claim 4 in which said height responsive means includes an optical sender and an optical receiver mounted on respective said adjacent divider plates and directed towards each other to provide a light beam path spanning each said space at said predetermined height and being adapted to actuate said severing means when interrupted.

6. A device as in claim 5 further including an opaque bar mounted on at least one of the inner said divider plates and adapted to be pivoted by contact with an asparagus spear in one of said spaces to rotate about said axis and interrupt the light path in the adjacent one of said spaces.

7. A device as in claim 3 in which said severing means includes a cylinder mounted on said sub-frame with the axis of said cylinder inclined downwardly and forwardly thereof, a plunger in and projecting from said cylinder and movable along said cylinder axis, a severing blade, means for mounting said blade on said plunger for a range of relative pivotal movement about a sub-axis normal to said cylinder axis, and means for urging said blade into alignment with said cylinder axis.

* * * * *